(12) United States Patent
Teuling et al.

(10) Patent No.: US 6,211,629 B1
(45) Date of Patent: Apr. 3, 2001

(54) CUT-OFF LEVEL SETTING

(75) Inventors: Dirk J. A. Teuling; John H. P. Moors, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/517,727

(22) Filed: Mar. 2, 2000

(30) Foreign Application Priority Data

Mar. 11, 1999 (EP) ................................................. 99200783

(51) Int. Cl.⁷ ...................................................... H04N 5/68
(52) U.S. Cl. ............................. 315/383; 315/1; 324/404; 348/379
(58) Field of Search ................................ 315/383, 1, 381, 315/382.1; 324/404; 348/379

(56) References Cited

U.S. PATENT DOCUMENTS

| 4,370,674 | | 1/1983 | Johnson et al. ........................ 358/74 |
| 5,872,432 | * | 2/1999 | Beeteson ............................ 315/382.1 |
| 5,892,337 | | 4/1999 | Van Den Broeke ................. 315/383 |
| 5,994,841 | * | 11/1999 | Allen et al. .............................. 315/1 |

FOREIGN PATENT DOCUMENTS

| 0840272A2 | 5/1998 | (EP) | ................................ G09G/1/00 |
| 0840272A3 | 5/1998 | (EP) | ................................ G09G/1/00 |
| 9728525 | 8/1997 | (WO) | ................................ G09G/1/00 |

* cited by examiner

Primary Examiner—Don Wong
Assistant Examiner—James Clinger
(74) Attorney, Agent, or Firm—Edward W. Goodman

(57) ABSTRACT

The cut-off level (Vcod) of a drive signal (Vd) of a cathode ray tube (3) is (Ib1, Ib2) occurring at these two levels (Vd1, Vd2).

8 Claims, 2 Drawing Sheets

CUT-OFF LEVEL SETTING

BACKGROUND OF THE INVENTION

1. Field of the Invention

The invention relates to a cut-off level setting device, a method of setting a cut-off level, and a display apparatus with a cathode ray tube and a cut-off level setting device.

In a cathode ray tube, an electron gun comprises a cathode heated by a heater filament, a first grid, a second grid, and further grids for focussing an electron beam emitted by the cathode. In a color cathode ray tube, three electron guns may be present, each of which generates an electron beam which is deflected to hit the corresponding one of three phosphors which emit light of different colors. The beam current (the number of electrons in the electron beam, also referred to as cathode current) is largely dependent on a voltage difference between the cathode and the first grid. However, the second grid voltage also has an influence on the beam current, but this influence is substantially less pronounced. The beam current may be modulated by varying the cathode voltage in dependence on the video information to be displayed. At a voltage difference of zero volts between the cathode and the first grid, the maximal beam current flows. When the voltage on the cathode becomes more positive with respect to the first grid, the beam current decreases. At a certain value of the cathode voltage the beam current becomes exactly zero. The corresponding voltage difference between the cathode and the first grid is generally referred to as the cut-off voltage or black level voltage. The corresponding voltage level on the cathode is referred to as the cut-off drive voltage level. Varying the second grid voltage changes this cut-off voltage. Consequently, the second grid voltage also determines the maximum beam current which can be generated by the electron gun.

2. Description of the Related Art

International Patent Application WO-A-97/28525, corresponding to U.S. Pat. No. 5,892,337, discloses a black level or cut-off level setting method wherein two control voltage levels are supplied to a cathode in a predetermined ratio to generate two cathode currents. The two cathode currents are measured to compare each one of the cathode currents with an associated one of two reference values having a predetermined ratio. The ratio of the reference values has a predetermined relation to the ratio of the two control voltages. 0Subtracting the associated reference value from each of the cathode currents generates two error voltages. One of the error voltages is integrated to obtain a black level setting value, the other error voltage is integrated to obtain a gain setting value. The black level setting value controls the DC-level of the control signal to be very near to the cut-off point of the cathode when a black video signal has to be displayed. The error voltages are controlled in a control loop in an iterative way to become zero after some time, such that the desired ratios are reached.

SUMMARY OF THE INVENTION

It is, inter alia, an object of the invention to provide a fast cut-off level setting. To this end, a first aspect of the invention provides a cut-off level setting device comprising drive means for successively supplying a first and a second video drive voltage level to a control electrode of a cathode ray tube to generate a first and a second beam current, respectively, and for supplying a first and a second measurement signal representing the first and second beam currents, respectively, and control means for supplying a control signal to the drive means to set a cut-off drive voltage level at which beam current is just about to flow in the cathode ray tube, characterized in that the control means comprises calculation means for calculating the cut-off drive voltage level from a mathematical formula defining the cut-off drive voltage level as a function of the first and second drive voltage levels and the first and second measurement signals. A second aspect of the invention provides a method of setting a cut-off level. A third aspect of the invention provides a display apparatus with a cathode ray tube and a cut-off level setting device.

The cut-off level setting device in accordance with the first aspect of the invention comprises a drive circuit and a control circuit. The drive circuit successively generates a first and a second drive voltage level (the control voltage level of the prior art) to obtain, respectively, a first and a second cathode current (further referred to as beam current) in the cathode ray tube. Moreover, the drive circuit measures the first and second beam currents. The invention is based on the insight that it possible to calculate the cut-off drive voltage level directly. The calculation circuit calculates the cut-off drive voltage level in one step from a mathematical formula defining the cut-off drive voltage level as a function of the first and second drive voltage levels and the first and second beam currents. Consequently, the circuit in accordance with the invention does not need to perform the time consuming iterative process of the prior art circuit, and the prior art integrator is superfluous.

In an embodiment of the invention, the cut-off voltage drive level is calculated using a formula which is a good representation of the reality in current cathode ray tubes. Further, in a more sophisticated embodiment it is possible to calculate the cut-off drive voltage from a mathematical formula defining the cut-off drive voltage level as a function of more than two drive voltage levels and associated measurement signals. Also other parameters may be included in the calculation, such as the value of the voltage on the second grid.

In another embodiment of the invention, it is possible to select a desired ratio of the first and the second measurement values. This is relevant when a highly accurate measurement has to be performed. For example, when an analog-to-digital converter is used, the values of the measurement signals should optimally fit within the dynamic range of the analog-to-digital converter.

In another embodiment of the invention, it is possible to obtain a desired ratio of the first and the second measurement values such that the term $\gamma\sqrt{Im2/Im1}$ is an integer and the calculation of the cut-off drive voltage level is simple.

In another embodiment of the invention, the measurement values are corrected for the off-set current to better represent the corresponding beam currents. The off-set current is caused by the leakage current of the electron gun and by the drive circuit.

These and other aspects of the invention will be apparent from and elucidated with reference to the embodiments described hereinafter.

DESCRIPTION OF THE PREFERRED EMBODIMENTS

Figure 1:
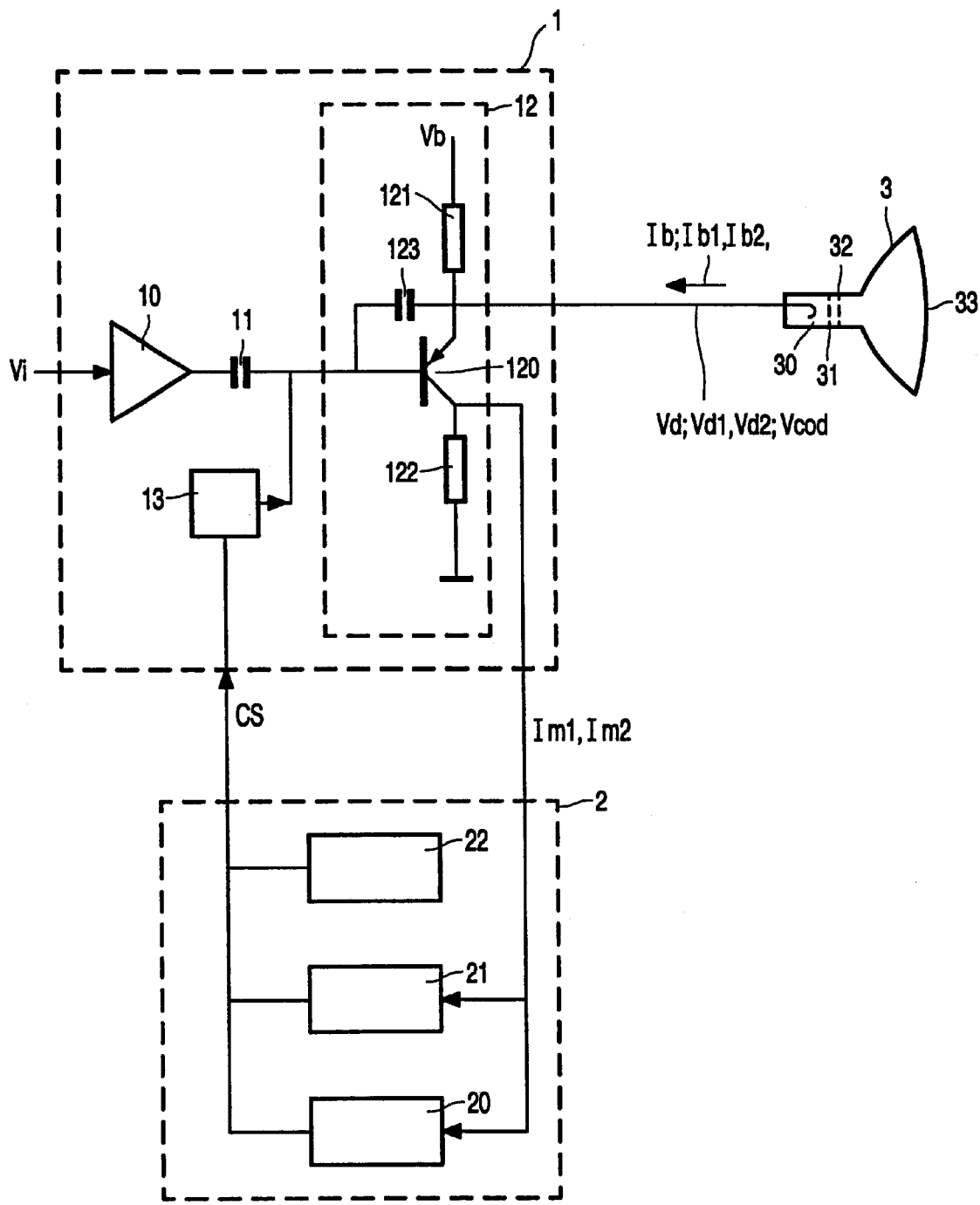
FIG. 1 shows a block diagram of a part of a display apparatus with a cathode ray tube and a black level setting device in accordance with an embodiment of the invention.

FIG. 1 shows a block diagram of a part of a display apparatus with a cathode ray tube and a cut-off level setting device in accordance with an embodiment of the invention. The cut-off level setting device comprises a drive circuit 1 and a control circuit 2.

A cathode ray tube 3 comprises an electron gun with a cathode 30, a first grid 31, and a second grid 32. The beam current Ib generated by the electron gun is determined by the voltage difference between the cathode 30 and the first grid 31, and by the voltage on the second grid 32. The drive circuit 1 receives an input signal Vi, and comprises an amplifier 10 for amplifying the input signal Vi, and a circuit 12 which enables measurement of the beam current Ib and which supplies the amplified input signal Vi as a drive signal Vd to the cathode 30. The circuit 12 may comprise a pnp transistor 120 arranged as an emitter follower. The transistor 120 has a base coupled to an output of the amplifier 10 to receive the amplified input signal Vi, an emitter connected to a supply voltage Vb via a bias resistor 121, and a collector connected to ground via a measurement resistor 122. The voltage across the measurement resistor 122 (which voltage is also referred to as the measurement signal (Im1 or Im2)) is a representation of the beam current Ib. A capacitor 123 is arranged between the base and the emitter of the transistor 120 to feed through high frequencies of the amplified input signal Vi. In the case that the video drive voltage Vd comprises very high frequencies, as, for example, in computer monitors, the output of the amplifier 10 may be AC-coupled to the circuit 12 via a capacitor 11. Now, a DC-level determining circuit 13 is connected to the circuit 12 to provide the DC-level of the drive voltage Vd.

In a normal operation mode of the display apparatus, the amplified input signal Vi is supplied to the output of the drive circuit 1 as the drive voltage Vd to be displayed on a display screen 33 of the cathode ray tube 3.

Figure 2:
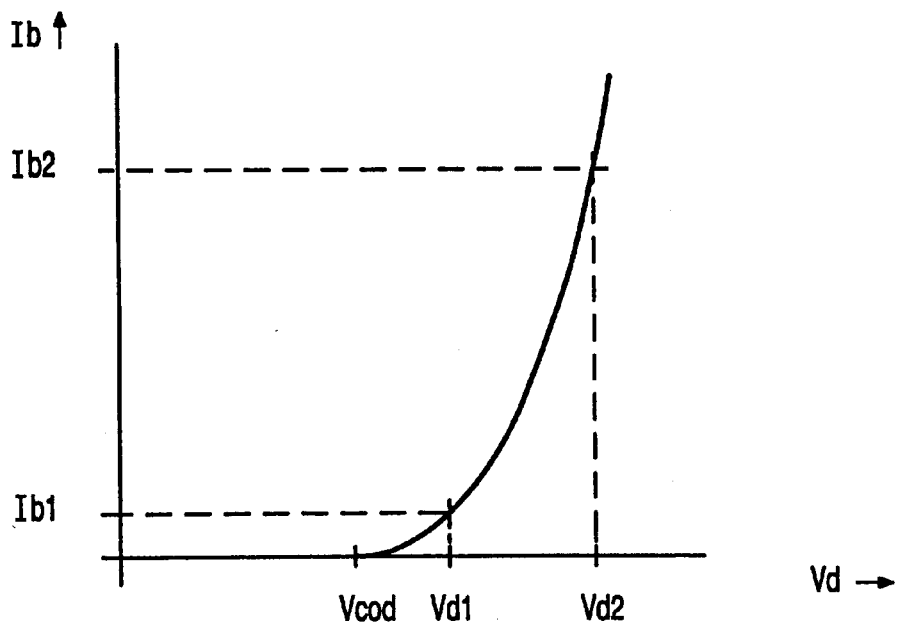
FIG. 2 shows a diagram of the beam current in the cathode ray tube as a function of the drive voltage.

In a cut-off level setting mode, instead of the input signal Vi, the drive circuit 1 first generates a first drive voltage level Vd1 and then a second drive voltage level Vd2 which differs from the first drive voltage level Vd1. The first and the second drive voltage levels Vd1, Vd2 cause first and second non-zero beam currents Ib1, Ib2, respectively. FIG. 2 shows a diagram of the beam current Ib in the cathode ray tube 3 as a function of the drive voltage Vd at a predetermined voltage on the second grid 32.

The circuit 12 supplies a first and a second measurement signal (Im1, Im2), which are indicative of the first and the second beam current Ib1 and Ib2, respectively.

The control circuit 2 comprises a calculation circuit 20 which calculates the cut-off drive voltage level Vcod at which a beam current is just about to flow in a cathode ray tube 3, from a mathematical formula defining the cut-off drive voltage level Vcod as a function of the first and second drive voltage levels Vd1, Vd2 and the first and the second measurement signals Im1, Im2. The calculation circuit 20 supplies a control signal CS to the drive circuit 1 for setting the DC-level of the drive voltage Vd to the cut-off drive voltage level Vcod. In this manner, during the normal operation mode, a black level of the input signal Vi is converted into the cut-off drive voltage level Vcod. Gray levels of the input signal Vi, which have an off-set value with respect to the black level, are reproduced as drives voltages Vd with corresponding off-set levels with respect to the cut-off drive voltage level Vcod. FIG. 1 shows that the control signal CS is supplied to the circuit 13 to control the DC level of the drive voltage Vd. When the amplifier 10 is directly coupled to the circuit 12, thus the capacitor 11 and the circuit 13 are not present, the control signal may act on the DC-bias level input of the drive means 1, as is known from many video processing integrated circuits.

In a preferred embodiment of the invention, the calculation circuit 20 comprises a microcomputer and an analog-to-digital converter. The analog first and second measurement signals Im1, Im2 are supplied as digital values to the microcomputer via the analog-to-digital converter. The microcomputer calculates the cut-off drive voltage level Vcod and supplies the control signal CS to the drive circuit 1 via a bus (for example, the I²C bus) to adapt the cut-off level of the drive signal Vd, accordingly. The microcomputer may calculate the cut-off drive voltage level Vcod with the equation:

$$Vcod = \frac{Vd2 - Vd1 * \sqrt[\gamma]{Im2/Im1}}{1 - \sqrt[\gamma]{Im2/Im1}}$$

wherein:
Vcod is the cut-off drive voltage level;
Vd1 and Vd2 are the first and the second drive voltage levels, respectively;
Im1 and Im2 are the first and the second measurement signals, respectively; and
γ is the gamma of the cathode ray tube 3.

This equation is a good approximation of the reality in current cathode ray tubes 3. It is clear that when a more accurate cut-off level setting is required, more complicated equations may be used. The invention is also useful for cathode ray tubes in which the relation between the cut-off drive voltage level and the first and second drive voltages and the first and second measurement signals differ from the above equation. In such a situation, another equation has to be used for the calculations.

The control circuit 2 may further comprise a comparison circuit 21 which compares the first and the second measurement signals Im1 and Im2 to supply a control signal CS to vary the level of at least one of the drive voltages levels Vd1, Vd2 until a desired ratio occurs between the first and the second measurement signals Im1 and Im2. In this way, it is possible to select the desired ratio such that the term $$\sqrt[\gamma]{\frac{Im2}{Im1}}$$

is an integer and the calculation circuit 20 needs to perform simple calculations only. For example, when γ=2.25, and Im2/Im1=4.75, the value of this term is 2. When the value of the first drive voltage level Vd1 is known, a very good estimate of the value of the second drive voltage level Vd2 is possible as the value of γ is at least approximately known. Thus, although it takes some time to control at least one of the drive voltage levels Vd1, Vd2 until the desired ratio occurs, the good approximation of the level of the second drive voltage Vd2 and an efficient search algorithm will minimize this time. Moreover, by performing at least one (non-zero) extra beam current measurement at a third drive voltage level, it is possible to calculate the value of γ. It is further possible to perform more than two measurements of the beam current and to use curve fitting to obtain the equation or function defining the relation between the drive voltage Vd and the beam current.

When the cathode ray tube has more than one electron gun to display color information, the cutoff drive voltage Vcod may be successively determined for each of the electron guns.

FIG. 2 shows a diagram of the beam current in the cathode ray tube as a function of the drive voltage. FIG. 2 shows, for a predetermined voltage on the second grid 32, the cut-off drive voltage Vcod at which the beam current Ib is just about to flow, and the first and second drive voltage levels Vd1 and Vd2 at which, respectively, the first and second beam currents Ib1 and Ib2 flow.

Figure 3:
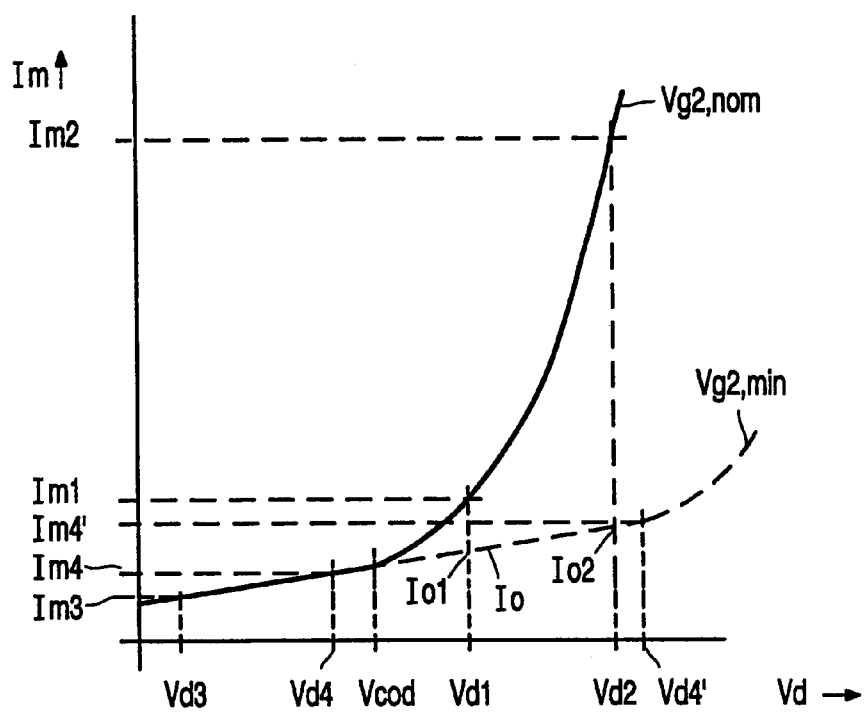
FIG. 3 shows a diagram of the measured beam current as a function of the drive voltage.

FIG. 3 shows a diagram of the measurement signal as a function of the drive voltage. The measurement signals Im1, Im2, as generated across the resistor 122, represent the beam currents Ib1, Ib2, respectively, to which an additional current (also referred to as off-set current), comprising the leakage current of the electron gun and circuit offset currents (for example, due to resistor 121), is added. The straight line Io in FIG. 3 represents this additional current. The measurement signals Im1, Im2 (in this case voltages) occur at the drive voltage levels Vd1, Vd2, respectively. The beam currents Ib1, Ib2 flowing at the drive voltage levels Vd1, Vd2, respectively, are equal to the measurement signals Im1, Im2 from which the associated measurement value caused by the additional currents Io1, Io2, respectively, are subtracted.

In another embodiment of the invention, the two measurements (at Vd3 and Vd4) at zero beam current for determining the off-set current and the two measurements (at Vd1 and Vd2) of the non-zero beam currents (Ib1 and Ib2), are performed at the same nominal voltage level Vg2, nom of the second grid 32. The curve showing the measurement current Im versus the drive voltage Vd at nominal voltage VG2,nom on the second grid 32 is indicated by the reference Vg2,nom. A linear function characterizing the straight line Io may be determined by solving the two equations found by substituting the two mutually different drive voltage levels Vd3, Vd4 at which no beam current Ib flows, and the corresponding measurement signals Im3, Im4, respectively, in the linear function. Subsequently, the values of the additional currents Io1 and Io2 can be calculated from this linear function by substituting the drive voltage levels Vd1 and Vd2, respectively.

In another embodiment of the invention, the two measurements (at Vd3 and Vd4') at zero beam current for determining the off-set currents (Im3 and Im4') are performed at a minimum voltage Vg2,min on the second grid 32. In this way, a more accurate determination of the off-set current is possible as the two measurement values Im3 and Im4' exhibit a larger difference. The dashed curve indicated by Vg2,min shows the measurement signal Im as a function of the drive voltage Vd at the minimum voltage Vg2,min on the second grid 32. In this embodiment, the next steps may be performed to obtain a correct cut-off drive level Vcod in a color cathode ray tube 3. First, for each electron gun, a first value of the off-set current Im4' is measured at a minimal voltage level (Vg2,min) on the second grid 32, and at maximum cathode voltage levels (maximum level of the drive voltage Vd). Then, at maximum cathode voltage levels, the voltage level on the second grid 32 is controlled such that a beam current starts to flow. The desired nominal level of the voltage (Vg2,nom) on the second grid 32 is somewhat lower than the grid voltage level thus found, such that no beam current flows. Now, the voltage on the second grid 32 is controlled to obtain its minimal level Vg2,min, and no beam current flows. The cathode voltage levels are controlled one by one to their minimal levels. In this way, for every electron gun, a second measurement value Im3 at which no beam current flows is known, and, for each electron gun, the linear function determining the additional current as function of the cathode voltage level can be determined. Subsequently, the voltage on the second grid 32 is controlled to obtain the desired nominal level Vg2,nom. Now, for each electron gun, the drive voltage levels Vd1, Vd2 are controlled such that the corresponding beam currents (the measurement signals Im1, Im2 corrected for the additional currents Io1, Io2, respectively) have the desired ratio, and the cut-off voltage levels Vcod can be calculated.

It should be noted that the above-mentioned embodiments illustrate rather than limit the invention, and that those skilled in the art will be able to design many alternative embodiments without departing from the scope of the appended claims.

As an example, a suitable amplifier stage/measurement circuit 10, 12 is known from U.S. Pat. No. 4,370,674, which is hereby incorporated by reference. It is also possible to vary the beam current by controlling the voltage on the first grid 31 instead of the cathode voltage.

In the claims, the word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A cut-off level setting device comprising:
   drive means for successively supplying a first and a second video drive voltage level to a control electrode of a cathode ray tube to generate a first and a second beam current, respectively, and for supplying a first and a second measurement signal representing the first and second beam currents, respectively; and
   control means for supplying a control signal to the drive means to set a cut-off drive voltage level at which a beam current is just about to flow in the cathode ray tube; characterized in that the control means comprises calculation means for calculating the cut-off drive voltage level using a mathematical formula defining the cut-off drive voltage level as a function of the first and second drive voltage levels and the first and second measurement signals.

2. The cut-off level setting device as claimed in claim 1, characterized in that the calculation means calculates the mathematical formula:

$$Vcod = \frac{Vd2 - Vd1 * \sqrt[\gamma]{Im2/Im1}}{1 - \sqrt[\gamma]{Im2/Im1}}$$

wherein:
   Vcod is the cut-off drive voltage level;
   Vd1 and Vd2 are the first and the second drive voltage levels, respectively;
   Im1 and Im2 are the first and the second measurement values, respectively; and
   γ is the gamma of the cathode ray tube.

3. The cut-off level setting device as claimed in claim 1, characterized in that the control means further comprises comparison means for controlling the drive means to vary at least one of said drive voltage levels to obtain a predetermined ratio between the first and second measurement signals.

4. The cut-off level setting device as claimed in claim 3, characterized in that the predetermined ratio is defined by $k^\gamma$, wherein k is a positive integer larger than 1, and $\gamma$ is the gamma of the cathode ray tube.

5. The cut-off level setting device as claimed in claim 1, characterized in that the control means further comprises means for controlling the drive means to supply two further, mutually different drive voltage levels at which no beam current is generated, the calculation means further calculating, based on the two mutually different drive voltage levels and corresponding measured beam currents, a first and a second off-set current occurring at the first and second drive voltage levels, respectively, and for subtracting the first and second off-set currents from the first and second measured beam currents, respectively, to form a first and a second corrected measured beam current, respectively.

6. The cut-off level setting device as claimed in claim 5, characterized in that the control means further comprises comparison means for controlling the drive means to vary at least one of said drive voltage levels to obtain a predetermined ratio between the first and second corrected measurement signals.

7. A method of setting a cut-off level comprising the steps:
successively supplying a first and a second video drive voltage level to a control electrode of a cathode ray tube to generate a first and a second beam current, respectively, and supplying a first and a second measurement signal representing the first and second beam currents, respectively; and
generating a control signal for controlling the drive means to set a cut-off drive voltage level at which the beam current is just about to flow in the cathode ray tube, characterized in that the generating step comprises the step:
calculating the cut-off drive voltage level using a mathematical formula defining the cut-off drive voltage level as a function of the first and second drive voltage levels and the first and second measurement signals.

8. A display apparatus with a cathode ray tube and a cut-off-level setting device, said cut-off-level setting device comprising:
drive means for successively supplying a first and a second video drive voltage level to a control electrode of the cathode ray tube to generate a first and a second beam current, respectively, and for supplying a first and a second measurement signal representing the first and second beam currents, respectively; and
control means for supplying a control signal to the drive means to set a cut-off drive voltage level at which a beam current is just about to flow in the cathode ray tube, characterized in that the control means comprises calculation means for calculating the cut-off drive voltage level using a mathematical formula defining the cut-off drive voltage level as a function of the first and second drive voltage levels and the first and second measurement signals.

* * * * *